United States Patent
Barezzani et al.

(10) Patent No.: US 10,646,983 B2
(45) Date of Patent: May 12, 2020

(54) HYDRODYNAMIC COMPRESSION OR CUTTING TOOL

(71) Applicant: Cembre S.p.A., Brescia (IT)

(72) Inventors: Gualtiero Barezzani, Brescia (IT); Cesare Braga, Brescia (IT)

(73) Assignee: Cembre S.p.A., Brescia (IT)

( * ) Notice: Subject to any disclaimer, the term of this patent is extended or adjusted under 35 U.S.C. 154(b) by 140 days.

(21) Appl. No.: 15/459,579

(22) Filed: Mar. 15, 2017

(65) Prior Publication Data
US 2017/0266791 A1 Sep. 21, 2017

(30) Foreign Application Priority Data

Mar. 18, 2016 (IT) .................. 102016000028615

(51) Int. Cl.
| | | |
|---|---|---|
| *B25B 27/10* | (2006.01) | |
| *B25B 27/02* | (2006.01) | |
| *H02G 1/00* | (2006.01) | |
| *B23D 29/00* | (2006.01) | |
| *H01R 43/042* | (2006.01) | |

(52) U.S. Cl.
CPC ............ *B25B 27/026* (2013.01); *B23D 29/00* (2013.01); *B23D 29/002* (2013.01); *B25B 27/10* (2013.01); *H01R 43/0428* (2013.01); *H02G 1/005* (2013.01)

(58) Field of Classification Search
CPC ....... B25B 27/026; B25B 27/10; B25B 27/02; B23D 29/00; B23D 29/002; H01R 43/0428; H01R 43/042; H20G 1/005; H02G 1/005; H02G 1/00

USPC ..................... 72/453.15–453.16; 30/247–251
See application file for complete search history.

(56) References Cited

U.S. PATENT DOCUMENTS

| | | | |
|---|---|---|---|
| 6,276,186 B1 * | 8/2001 | Frenken | B21D 39/04 29/751 |
| 7,254,982 B2 * | 8/2007 | Frenken | B25B 27/10 60/477 |
| 7,487,654 B2 * | 2/2009 | Lefavour | B25B 27/10 29/720 |
| 7,841,223 B2 * | 11/2010 | Rollins | B25B 27/10 29/751 |

(Continued)

FOREIGN PATENT DOCUMENTS

| | | |
|---|---|---|
| DE | 20 2006 001 889 U1 | 4/2007 |
| DE | 20 2009 003 196 U1 | 6/2010 |

(Continued)

*Primary Examiner* — Kenneth E Peterson
*Assistant Examiner* — Nhat Chieu Q Do
(74) *Attorney, Agent, or Firm* — Blank Rome LLP

(57) ABSTRACT

A hydrodynamic compression or cutting tool comprises a housing, an electric motor arranged in the housing and having a motor rotational axis, a gripping portion formed by the housing and extending around the motor and along the motor rotational axis, a hydraulic pump arranged inside the housing and which can be driven by the motor so as to move a actuating piston along a actuating axis, a transmission mechanism arranged inside the housing between the motor and the hydraulic pump, two jaws connected to the housing and to the actuating piston, and which can be moved between an open position and a closed position for carrying out the compression or cut, wherein the actuating axis and the motor rotational axis are reciprocally parallel and offset.

13 Claims, 2 Drawing Sheets

(56) References Cited

U.S. PATENT DOCUMENTS

| | | | |
|---|---|---|---|
| 10,312,653 B2* | 6/2019 | Ballard | H01R 43/0427 |
| 2006/0272381 A1 | 12/2006 | Ayer et al. | |
| 2007/0256554 A1 | 11/2007 | Montminy et al. | |
| 2010/0000288 A1* | 1/2010 | Barezzani | B25B 27/146 |
| | | | 72/453.15 |
| 2014/0182874 A1* | 7/2014 | Barezzani | B25B 27/10 |
| | | | 173/217 |
| 2016/0363510 A1* | 12/2016 | Kanack | B25B 27/10 |

FOREIGN PATENT DOCUMENTS

| | | |
|---|---|---|
| DE | 20 2009 015 515 U1 | 5/2011 |
| WO | WO 2008/032341 A1 | 3/2008 |
| WO | WO 2015/033128 A1 | 3/2015 |
| WO | WO 2016/005838 A1 | 1/2016 |

* cited by examiner

HYDRODYNAMIC COMPRESSION OR CUTTING TOOL

BACKGROUND OF THE INVENTION

1. Field of the Invention

The present invention relates to a hydrodynamic compression or cutting tool.

2. Description of the Related Art

Hydrodynamic compression and cutting tools are often used to carry out determined connection operations, e.g. compressing connectors about electric wires or for hydraulic pipes, compressing rivets, or for cutting operations, e.g. cutting electric wires during electric system installation and maintenance.

Such tools usually comprise an electric motor supplied by an accumulator and a hydraulic pump which causes an increase of pressure of a hydraulic liquid acting on a piston to move it against the bias of a pressure spring. In turn, the piston is connected to a movable jaw so as to move it during the compression operation towards a fixed jaw of the tool. The jaws may be shaped and/or provided with interchangeable accessory elements so as to adapt to a particular object, e.g. an electric contact to be compressed or a metallic bar to be cut.

The compression or cutting operations are frequently hindered by very narrow space conditions, so that the compression tool acts not only as working head to carry out the compression or cutting operation, but is also an extension of the operator's hand, making it possible to reach working positions either between or behind the other hindering structures. It is thus indispensable for the compression or cutting tools to have a possibly small dimension in direction transversal to the direction of access to the working position. The most known shapes of hand-held hydraulic compression or cutting tools (obviously fixed machine tools installed in stationary manner are not considered here) are pistol-shaped, such as hand-held electric drills, and elongated bar-shaped, such as a torch.

In pistol-shaped tools, the grip extends along a gripping axis and the electric motor, the hydrodynamic pump with the piston for driving the jaws extend along a actuation axis either transversal or perpendicular to the gripping axis. The transversal orientation of the two axes well adapts to the anatomy of the hand without requiring bending of the wrist, but implies a considerable dimension of the tool in direction transversal to the direction of access to the working position, and such transversal dimension is undesirably close to the working head.

In elongated bar-shaped tools, the grip and an electric motor accommodated therein extend along a motor axis, and the hydrodynamic pump and the piston for driving the jaws are coaxial with the same motor axis which constitutes a longitudinal axis of the tool. The coaxial orientation of the motor-gripping group and the pump-actuation cylinder group minimizes the dimension of the tool in direction transversal to the direction of access to the working position so that the tool itself can easily access working positions in even very narrow spaces.

However, the coaxial arrangement of the grip is not completely compatible with the anatomy of the operator's hand and requires an unnatural bending of the wrist in the attempt to align the axis of the actuation piston with the forearm. This undesirably reduces the ergonomics of the tool, increases the fatigue of the musculature of the forearm and of the hand, and implies additional transversal dimensions due to the posture of the operator's hand and arm and not to the tool itself.

SUMMARY OF THE INVENTION

It is thus the object of the present invention to provide a hydrodynamic compression tool having features such to solve at least some of the drawbacks mentioned with reference to the prior art.

It is a particular object of the invention to provide a hydrodynamic compression and/or cutting tool having features such to better conciliate the needs of ergonomics and of reduced transversal dimensions.

The object of the invention is achieved by means of a hydrodynamic compression or cutting tool according to the following description and claims. The dependent claims relate to advantageous embodiments.

According to an aspect of the invention, a hydrodynamic compression or cutting tool comprises
- a housing,
- an electric motor, which can be powered by an accumulator or by mains supply, the motor being arranged inside the housing and having a motor rotational axis,
- a gripping portion formed by the housing and extending around the motor and along the motor rotational axis,
- a hydraulic pump arranged inside the housing and which can be actuated by the motor so as to generate a pressure increase of a hydraulic liquid acting on an actuation piston for moving the actuation piston along an actuation axis, wherein the actuation piston is coaxial with the actuation axis,
- a transmission mechanism arranged inside the housing between the motor and the hydraulic pump,
- two jaws connected to the housing and to the actuating piston, so that, in response to the movement of the actuating piston, the jaws perform a relative movement between an open position and a closed position for carrying out the compression or cut, wherein the actuating axis and the motor rotational axis are mutually either parallel or oriented in the same direction with a maximum mutual tilting angle lower than 20°, preferably lower than 10°, wherein the actuating axis and the motor rotational axis are mutually offset at least in an offset coupling area formed by at least either the transmission mechanism or the hydraulic pump.

Advantageously, the actuating axis and the motor rotational axes are mutually offset (distanced) across the whole compression or cutting tool.

Also advantageously, the actuating axis is offset with respect to the motor rotational axis towards an upper side of the tool, opposite to a lower side of the tool on which an actuating button for actuating the motor is arranged.

The compression tool thus configured improves the operator's hand-forearm posture and aligns better with the operator's forearm. Furthermore, this makes it possible to reduce transversal dimensions caused by the operator's hand and forearm posture and not by the tool.

Finally, the offsetting of the actuating axis with respect to the motor axis makes it possible to approach the centre of gravity of the pumping assembly, of the actuating cylinder and of the jaws towards the operator, and to form an offset step immediately over the thumb and the index finger. By means of the offset step, the tool may rest on the hand allowing the operator to reduce the manual gripping force when the operator transports or simply holds the tool in his hand.

BRIEF DESCRIPTION OF THE DRAWINGS

In order to better understand the invention and appreciate its advantages, the description of some embodiments will be provided below by way of non-limiting examples with reference to the accompanying figures, in which.

DETAILED DESCRIPTION OF THE PREFERRED EMBODIMENTS

Figure 1:
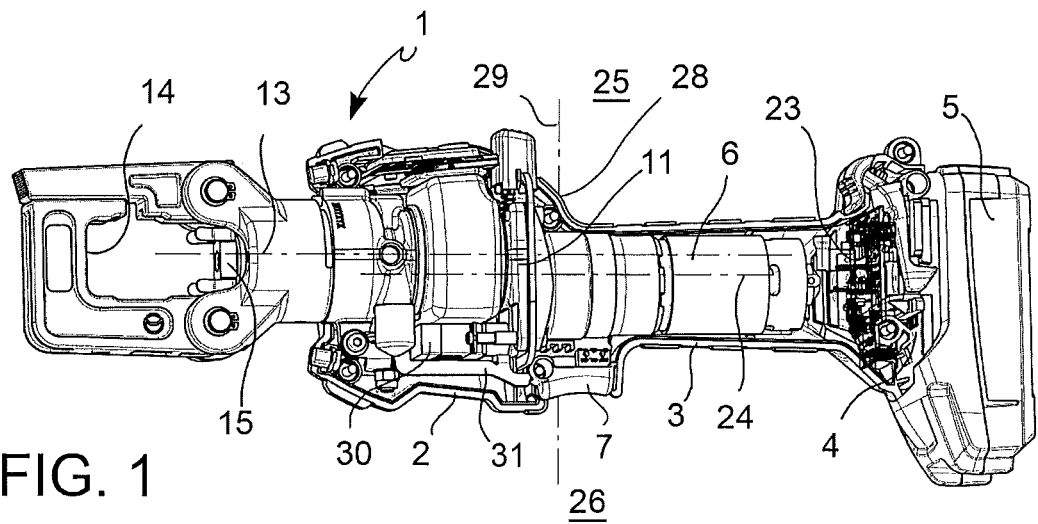
FIG. 1 is a side view of a compression/cutting tool according to an embodiment, in which one part of the housing has been removed.

With reference to the figures, a hydrodynamic compression and/or cutting tool 1 comprises a housing 2 with a grip-shaped portion 3 and a coupling portion 4 for connecting, preferably by snapping, a replaceable and rechargeable electric accumulator 5. The housing 2 accommodates an electric motor 6 which can be supplied by the accumulator 5 by means of a power and control circuit 23 which comprises a switch on which acts a manual actuating button 7 arranged adjacent to the grip 3.

The gripping portion 3 of the housing 2 extends about the electric motor 6 and along the motor rotational axis 24.

A transmission mechanism 8 is arranged in the housing 2 and is connected to the drive shaft of the motor 6 so as to transform the rotational motion of the drive shaft into a cyclic or reciprocating, e.g. translational, motion.

The transmission mechanism 8 may comprise a planetary reduction gear 9 with one or more stages, preferably with two stages, connected to the drive shaft and configured to reduce the speed and increase the torque of the rotational movement generated by the motor 6. The transmission mechanism 8 may further comprise a cam disc or oscillating tilted disc 10, connected to the motor, or, if possible, to the reducer, in particular at the output side of the planetary reduction gear 9, and configured to transform the rotational movement output from the motor or from the reducer into a reciprocating translational movement.

A hydraulic pump 11, also accommodated in the housing 2, is connected to the transmission mechanism 8 and is adapted to carry out, in response to the cyclic or alternating motion of the transmission mechanism 8, an increase of pressure of a pressure fluid/liquid acting on a actuating piston 12, coaxial with a actuating axis 13, so as to move the actuating piston 12 along a piston stroke in direction of the actuating axis 13.

The tool 1 further comprises a fixed jaw 14 rigidly connected to the housing 2 and arranged at a front end of the tool 1, as well as a movable jaw 15 supported by the housing 2 so as to be able to slide or turn with respect to the fixed jaw 14. The movable jaw 15 is connected to the actuating piston 12 so that, in response to the movement of the actuating piston 12, it is moved towards the fixed jaw 14 from an open position to a closed position to carry out the compression or cutting operation.

In the open position, the jaws 14, 15 are distanced apart to be able to accommodate an object to be compressed or cut and, in the closed position, the jaws 14, 15 are mutually approached and in a relationship (compression or cutting or shearing or punching relationship) such to have completed the cutting/shearing/punching or compression operation.

A return spring 16 acts either directly or indirectly on the actuating piston 12, so as to bias the latter elastically to the resting position and the movable jaw 15 to the open position, moved away from the fixed jaw 14.

According to an embodiment, the hydraulic pump 11 comprises a tank 17, a cylinder-piston pumping assembly 18, 19, an cylinder-actuating piston assembly 20, 12 and a maximum pressure valve 21.

The cylinder-piston pumping group 18, 19 may comprise a pumping cylinder 18 with an intake opening connected to the tank 17 through a non return valve which allows the flow of hydraulic oil from the tank 17 into the pumping cylinder 18, and a discharge opening connected to a actuating cylinder 20 of the actuating cylinder-piston group 20, 12 through a non return valve which allows the flow of hydraulic oil from the pumping cylinder 18 into the actuating cylinder 20. A pumping piston 19 may be accommodated in the pumping cylinder 18 and coupled so as to translate together with a oscillation member (e.g. the cam disc 10) of the transmission mechanism 8.

Figure 2:
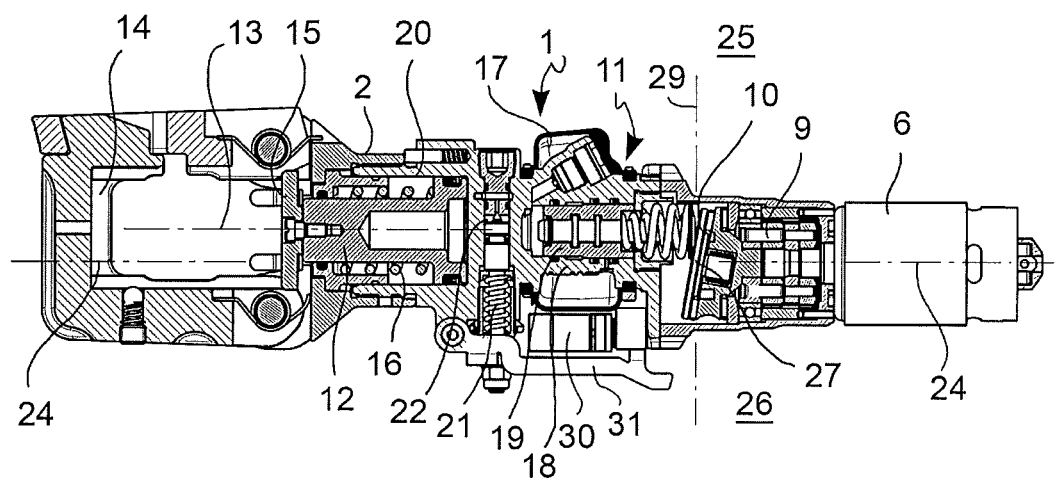
FIG. 2 is a side view in a longitudinal section of a compression/cutting tool according to an embodiment.
Figure 3:
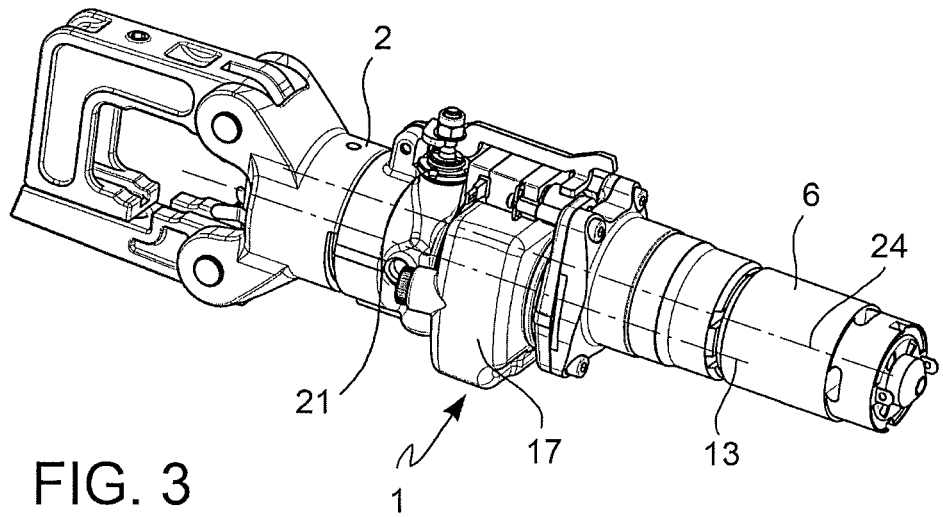
FIG. 3 is a partial perspective view of a compression/cutting tool according to an embodiment, in which a part of the housing has been removed.

The maximum pressure valve 21 is arranged in a return duct 22 of the fluid which connects the actuating cylinder 20 to the tank 17 (FIG. 2).

In this manner, the reciprocating translational movement of the transmission mechanism 8 generated by the rotational movement of the motor shaft causes an oscillating translational movement of the pumping piston 19 which pumps the pressure liquid from the tank 17 to the actuating cylinder 20 to advance the actuating piston 12, together with the movable jaw 14, from the open position to the closed position (or more generally: to move the jaws 14, 15 mutually from the open position towards the closed position) until reaching a predetermined maximum calibration pressure in the actuating cylinder 20. When the maximum calibration pressure is reached, the maximum pressure valve 21 automatically opens the return duct 22 of the fluid to discharge the pressure liquid from the actuating cylinder 20 into the tank 17.

According to aspect of the invention, the actuating axis 13 and the motor rotational axis 24 are either mutually parallel or tilted with a tilt lower than 20°, preferably lower than 10°, even more preferably lower than 2°, and the actuating axis 13 and the motor rotational axis 24 are mutually offset (distanced) at least in an offset coupling zone 27 formed by at least one of the transmission mechanism 8 and of the hydraulic pump 11.

The advantages in terms of ergonomics and conciliation between transversal dimensions and optimisation of the space for arranging the inner components of the tool 1 increase as the relative orientation of the actuating axis 13 and of the motor rotation axis 24 approaches a parallel or nearly parallel orientation. On the other hand, according to the weight distribution between the working head, the pump, the motor-transmission assembly and the accumulator, a relative tilting of the actuating axis 13 and of the motor rotational axis 24 in the above described ranges may contribute to a better balancing of the tool 1 with respect to the gripping portion and/or with respect to the operator's wrist.

Advantageously, the actuating axis 13 and the motor rotational axis 24 are mutually offset, at least in the offset coupling area 27, by a distance comprised between 5 mm and 20 mm, preferably from 8 mm to 12 mm, even more preferably by 10 mm. Preferably, the actuating axis 13 and the motor rotational axis 24 are mutually offset (distanced, and thus do not intersect) across the entire tool 1.

Also advantageously, the actuating axis 13 is offset with respect to the motor rotational axis 24 towards an upper side 25 of the tool 1, opposite to a lower side 26 of the tool 1 on which the actuating button 7 is arranged.

The compression tool thus configured improves the operator's hand-forearm posture and aligns better with the operator's forearm. This makes it possible to reduce the transversal dimensions caused by the operator's hand and forearm posture and not by the tool 1.

Furthermore, the offset of the actuating axis 13 with respect to the motor rotational axis 24 makes it possible to approach the centre of gravity of the pumping assembly 11, of the actuating cylinder-piston assembly 20, 12 and of the jaws 14, 15 towards the operator.

In one embodiment, the offset between the motor rotational axis 24 and the actuating axis 13 is made in an offset coupling zone 27 between an oscillation member (e.g. the cam disc 10) of the transmission mechanism 8 and the pumping piston 19 of the hydraulic pump 11, in which the oscillation member (e.g. the cam disc 10) of the transmission mechanism 8 has a rotation axis thereof offset with respect to the axis of the pumping piston 19.

Figure 4:
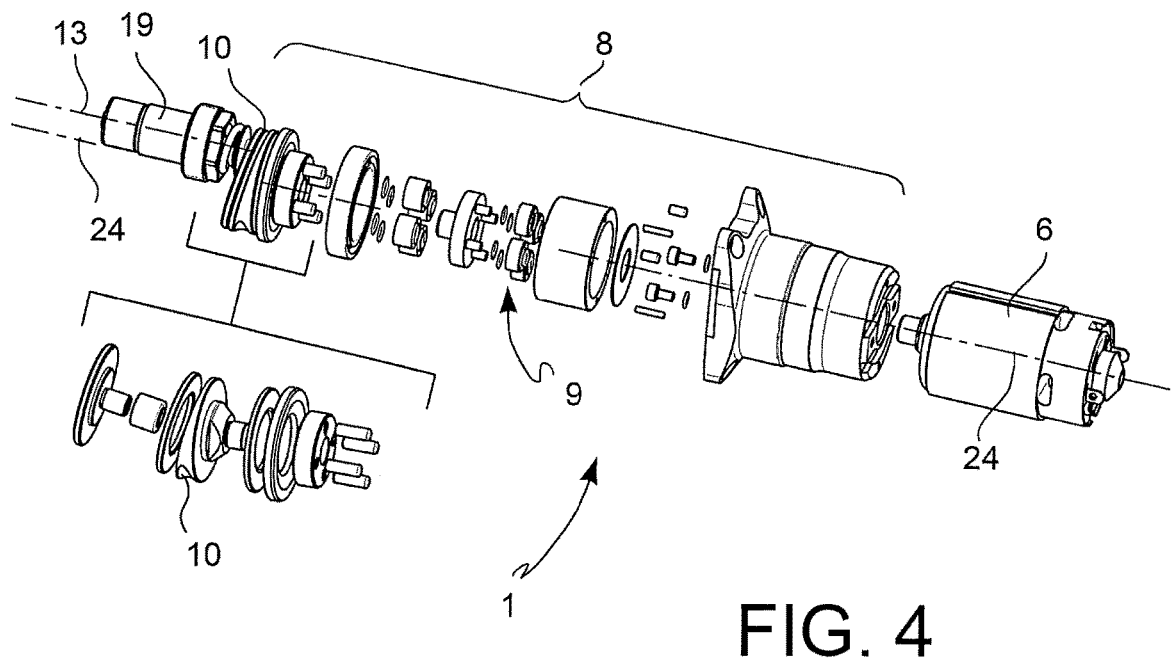

By virtue of its offset positioning, eccentric with respect to the oscillation member, the pumping piston is already positioned on the circumference of the cam track of the oscillation member and does not require a widened disc end thereof to reach the cam track of the oscillation member. As can be seen in the figures, the contact between the pumping piston and the oscillation member occurs by means of the interposition of an axial roller bearing (FIG. 4).

Figure 5:
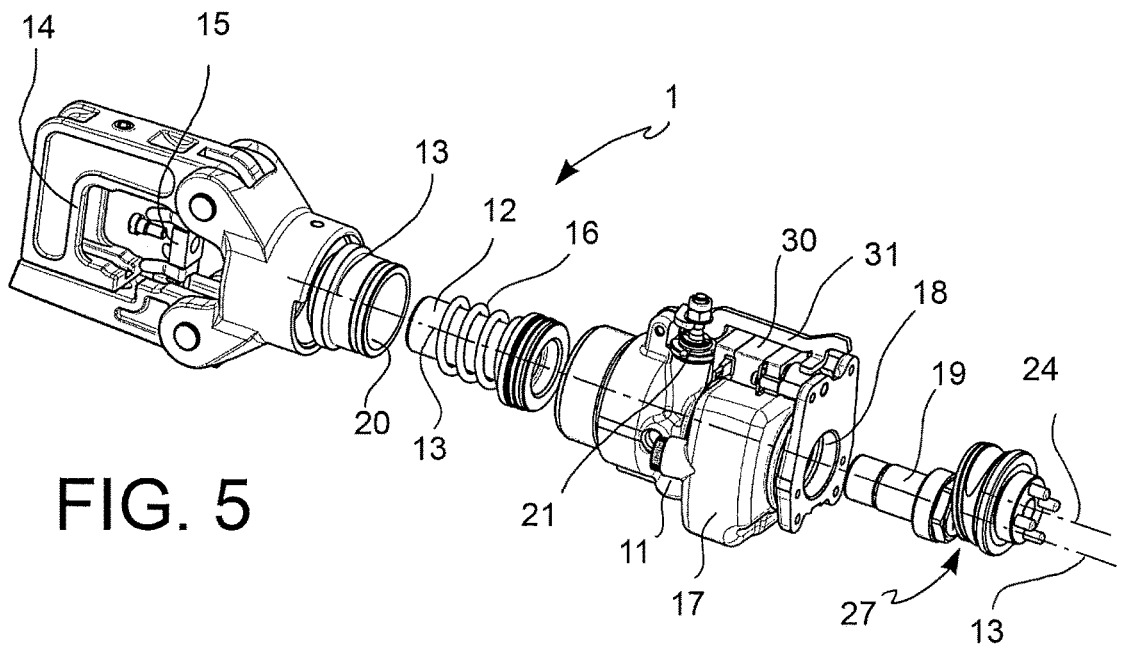
FIGS. 4 and 5 are exploded views (turned with respect to each other by approximately) 180° of parts of the tool shown in FIG. 3.

In a preferred embodiment, the oscillation member (e.g. the cam disc 10) of the transmission mechanism 8 has a rotational axis thereof coaxial with the motor rotational axis 24, while the pumping piston 19 of the hydraulic pump 11 is coaxial with the actuating axis 13 (FIGS. 2, 5).

More in general, the pumping piston-cylinder assembly 18, 19 is arranged with an offset with respect to the motor rotational axis 24 towards the actuating axis 13. Preferably, the pumping cylinder-piston assembly 18, 19 is coaxial to the actuating axis 13.

Similarly, the transmission mechanism 8 is arranged in offset manner with respect to the actuating axis 13 towards the motor rotational axis 24. Preferably, the transmission mechanism 8 is substantially coaxial to the motor rotational axis 24.

According to a further embodiment, either at or adjacent the offset coupling zone 27, the housing 2 forms an outer offset step 28 on the upper side 25 of the tool 1 and diametrically opposite to the actuating button 7. The offset step 28 delimits the gripping portion 3 over the back of the hand between the operator's thumb and index finger and creates, again over the back of the operator's hand between thumb and index finger, a resting surface which allows the operator to reduce the manual gripping force when the operator transports or simply holds the tool 1 in his hand.

Advantageously, an offset plane 29 which is orthogonal to the motor rotational axis 24 and passing through the offset coupling (or interface) zone 27, also intersects the offset outer step 28 and the actuating button 7. This optimises the use of the space in the housing 2 and improves the ergonomics (manual gripping) of the tool 1.

In a further embodiment, the battery coupling portion 4 and/or the battery 5 coupled thereto is arranged on a rear side of the tool 1, opposite to the jaws 14, 15, and extends transversally to the motor rotational axis 24 on the lower side 26 of the tool 1 beyond the maximum dimension of the gripping portion 3 and also beyond the maximum dimension of the housing 2 in the zones of the transmission mechanism 8 and of the hydraulic pump 11. On the contrary, the battery coupling portion 4 and/or the battery 5 coupled thereto extends transversally to the motor rotational axis 24 on the upper side 25 of the tool 1 substantially not beyond the maximum extension of the housing 2 (including possible buttons) in the area of the hydraulic pump 11.

This clears space in the region of the operator's wrist for an easier alignment of the tool with the forearm.

According to a further embodiment, the housing 2 accommodates an auxiliary return device 30 associated with the actuating button 7 and connected with a mechanism 31 for opening the maximum pressure valve 21, so as to be able to trigger an opening of the maximum pressure valve 21 and consequently the return of the hydraulic fluid to the tank 17 and the return of the actuating piston 12 towards its resting position in which the jaws 14, 15 are open, by means of the same actuating button 7 which also controls the actuation of the electric motor 6.

In a first example of embodiment, it may be provided that:
- a first movement of the actuating button 7 in a first direction (pressing towards the inside of the housing 2) triggers the actuation of the electric motor 6 and the closing of the maximum pressure valve 21,
- a second movement of the same actuating button 7 in a second direction (released towards the outside of the housing 2) interrupts the driving of the electric motor 6 and opens the maximum pressure valve 21, in particular when an end of working cycle condition, e.g. maximum pressure, is already reached.

With particular economy of space (by virtue of the offsetting of the axes 13, 24 which are parallel (or nearly parallel), the auxiliary return device 30 is positioned adjacent to the hydraulic pump 11, in particular adjacent to the tank 17 or to the pumping cylinder-piston assembly 18, 19, on the lower side 26 of the tool 1 opposite to the offsetting direction of the actuating axis 13 with respect to the motor rotational axis 24.

By way of example, the auxiliary return device 30 may comprise an electric motor, which can be driven by means of the actuating button 7 and connected, by means of a cam and lever transmission 31, to a shutter of the maximum pressure valve 21.

As shown in the figures, housing 2 means both an outer casing part, which can be made of plastic material, and a supporting part, e.g. made of metal, which ensures the positioning and mutual connection of the single functional assemblies of the tool 1. If a portion of the housing 2 is interrupted, e.g. in regions in which a part of body or casing of a component of the tool 1 is exposed to the outside, such part of body or casing of the components forms an outer casing zone of the tool 1 and thus part of the housing 2.

The invention claimed is:

1. A hydrodynamic compression or a cutting tool, comprising:
   a housing,
   an electric motor, which can be powered by an accumulator or by mains supply, said motor being arranged inside the housing and having a motor rotational axis, a gripping portion formed by the housing and extending around the motor and along the motor rotational axis, a hydraulic pump arranged inside the housing, wherein the hydraulic pump includes a pumping piston, wherein the pumping piston has an axis, and wherein the hydraulic pump can be actuated by the motor so as to generate a pressure increase of a hydraulic liquid acting on an actuating piston for moving the actuating piston along an actuating axis, wherein the actuating piston is coaxial with the actuating axis, a transmission mechanism arranged inside the housing between the motor and the hydraulic pump, wherein said transmission mechanism includes an oscillation member, and two jaws connected to the housing and to the actuating piston so that, in response to the movement of the actuating piston, the jaws make a relative movement between an open position and a closed position for carrying out the compression or cut, wherein:

the actuating axis and the motor rotational axis are parallel to one another, the actuating axis and the motor rotational axis are offset from one another at least in a coupling area formed by at least one of the transmission mechanism and the hydraulic pump, the actuating axis is offset with respect to the motor rotational axis towards a side of the tool opposite a side of the tool on which an actuating button is arranged for actuating the motor, in the coupling area, the housing forms an offset outer step on the upper side of the tool, wherein the offset outer step delimits the gripping portion and creates a resting surface, and wherein an offset plane which is orthogonal to the motor rotational axis and passing through the coupling area, intersects the offset outer step and the actuating button, wherein the hydrodynamic compression or cutting tool includes an offset coupling zone, wherein the offset coupling zone is between the oscillation member of the transmission mechanism and the pumping piston of the hydraulic pump, wherein the oscillation member of the transmission mechanism has a rotation axis, and wherein the rotation axis of the oscillation member is offset from the axis of the pumping piston, and wherein the offset outer step is diametrically opposite to the actuating button.

2. The tool according to claim 1, wherein the actuating axis and the motor rotational axis are spaced apart from each other across the entire tool.

3. The tool according to claim 1, wherein the offset between the motor rotational axis and the actuating axis is made by a coupling between the oscillation member of the transmission mechanism and the pumping piston of the hydraulic pump, wherein the oscillation member has an own rotational axis which is offset with respect to a longitudinal axis of the pumping piston.

4. The tool according to claim 1, wherein a pumping piston-cylinder assembly of the hydraulic pump is arranged with an offset with respect to the motor rotational axis towards the actuating axis.

5. The tool according to claim 4, wherein the piston-cylinder pumping assembly is coaxial to the actuating axis.

6. The tool according to claim 1, wherein the transmission mechanism is arranged with an offset with respect to the actuating axis towards the motor rotational axis.

7. The tool according to claim 6, wherein the transmission mechanism is coaxial to the motor rotational axis.

8. The tool according to claim 1, wherein a battery coupling portion of the housing or the accumulator coupled thereto is arranged on a back side of the tool opposite to the jaws and projects transversally with respect to the motor rotational axis on the lower side of the tool beyond the maximum extension of the housing in regions of the gripping portion, transmission mechanism and hydraulic pump.

9. The tool according to claim 8, wherein the battery coupling portion or the accumulator coupled thereto extends transversally to the motor rotational axis on the upper side of the tool not beyond the maximum extension of the housing in the area of the hydraulic pump.

10. The tool according to claim 1, comprising an auxiliary return device located inside the housing and connected with a maximum pressure valve of the hydraulic pump and with the actuating button for actuating the motor so that, by two different movements of the same actuating button, it is possible: A) activate the motor for moving the jaws towards the closed position, and B) open the maximum pressure valve to return the jaws in the open position, wherein the auxiliary return device is arranged beside the hydraulic pump on a side of the tool opposite to the offset direction of the actuating axis with respect to the motor rotational axis.

11. The tool according to claim 1, wherein the actuating axis and the motor rotational axis are offset to one another, at least in the offset coupling area, from 5 mm to 20 mm.

12. The tool according to claim 1, wherein the actuating axis and the motor rotational axis are offset to one another, at least in the offset coupling area, from 8 mm to 12 mm.

13. The tool according to claim 1, wherein the actuating axis and the motor rotational axis are offset to one another, at least in the offset coupling area, by 10 mm.

* * * * *